(12) United States Patent
Coward et al.

(10) Patent No.: US 10,213,797 B2
(45) Date of Patent: *Feb. 26, 2019

(54) ELECTROSTATIC POWDER FEEDER

(71) Applicant: Powder Motion Labs, LLC, Rolla, MO (US)

(72) Inventors: Connor L. Coward, O'Fallon, MO (US); Todd E. Sparks, Rolla, MO (US)

(73) Assignee: Powder Motion Labs, LLC, Rolla, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,451

(22) Filed: Feb. 20, 2018

(65) Prior Publication Data

US 2018/0243768 A1  Aug. 30, 2018

Related U.S. Application Data

(60) Provisional application No. 62/463,309, filed on Feb. 24, 2017.

(51) Int. Cl.
*G05D 7/06* (2006.01)
*B05B 7/14* (2006.01)
(Continued)

(52) U.S. Cl.
CPC .......... *B05B 7/1445* (2013.01); *B05B 5/001* (2013.01); *B05B 5/008* (2013.01); *B05B 5/0418* (2013.01);
(Continued)

(58) Field of Classification Search
CPC ....... B05B 7/1445; B05B 5/001; B05B 5/008; B05B 5/0418; B05B 5/1616; B05B 5/1683; G05D 7/0605; B33Y 40/00
(Continued)

(56) References Cited

U.S. PATENT DOCUMENTS 827,770 A * 8/1906 Woodsome ............... B03C 7/12
                                                                209/130
960,470 A * 6/1910 Wentworth ............... B03C 7/12
                                                                209/130
(Continued)

OTHER PUBLICATIONS

Co-pending U.S. Appl. No. 15/899,482, filed Feb. 20, 2018.
Co-pending U.S. Appl. No. 14/994,973, filed Jan. 13, 2016.

*Primary Examiner* — Benjamin R Shaw
(74) *Attorney, Agent, or Firm* — Don V. Kelly; Evans & Dixon, L.L.C.

(57) ABSTRACT

A electrostatic powder feeder includes a body having a cavity. The cavity is shaped and sized to hold a supply of powder particles and is defined by a cavity wall. A diverter is disposed in the cavity and positioned away from the cavity wall so as to create a powder flow space between the diverter and cavity wall. The feeder includes an electrode and a powder landing surface connected to a power supply. The electrode is positioned remotely from the powder landing surface at a distance at which it can act upon powder resting upon the powder landing surface. An aperture through which powder particles may fall is disposed in or proximate to the powder landing surface. An insulator is positioned between the electrode and the powder landing surface. The power supply produces an alternating electric potential that creates an alternating electric field between the electrode and powder landing surface that causes powder particles to oscillate and eventually fall through the aperture. In an alternative embodiment, the powder landing surface is on a diaphragm connected to the body and disposed below the powder flow space. The diaphragm is sized and shaped to hold a quantity of powder falling from the powder flow space. The diaphragm includes an aperture. A vibration actuator is affixed to the diaphragm, which provides a vibratory force to the powder particles.

9 Claims, 9 Drawing Sheets

Figure 1:
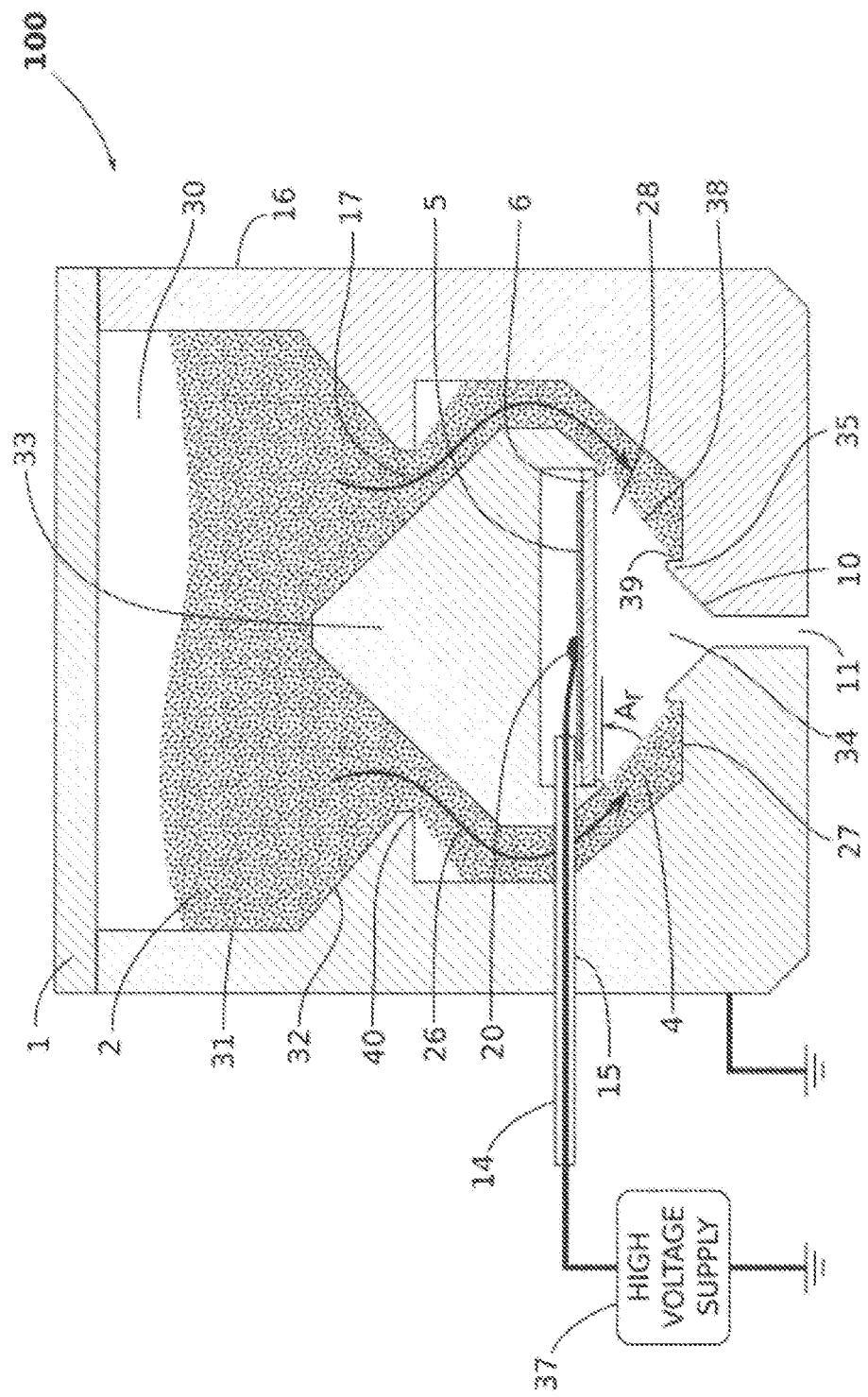

(51) Int. Cl.
*B05B 5/16* (2006.01)
*B05B 5/04* (2006.01)
*B05B 5/00* (2006.01)
*B33Y 40/00* (2015.01)

(52) U.S. Cl.
CPC .......... *B05B 5/1616* (2013.01); *B05B 5/1683* (2013.01); *G05D 7/0605* (2013.01); *B33Y 40/00* (2014.12)

(58) Field of Classification Search
USPC .......................................................... 222/196
See application file for complete search history.

(56) References Cited

U.S. PATENT DOCUMENTS

| | | | | |
|---|---|---|---|---|
| 2,180,804 A | * | 11/1939 | Fahrenwald | ............... B03C 7/00 |
| | | | | 209/127.2 |
| 2,187,717 A | | 1/1940 | Weyandt | |
| 2,197,864 A | * | 4/1940 | Johnson | ................... B03C 7/00 |
| | | | | 106/746 |
| 2,361,946 A | * | 11/1944 | Johnson | .................... B03C 7/04 |
| | | | | 209/127.3 |
| 3,517,861 A | | 6/1970 | De La Vega | |
| 3,534,787 A | * | 10/1970 | Heck | ....................... B05C 19/04 |
| | | | | 118/308 |
| 3,788,449 A | | 1/1974 | Baberowski et al. | |
| 3,909,068 A | | 9/1975 | Coucher | |
| 4,071,169 A | * | 1/1978 | Dunn | ................... B01F 13/0001 |
| | | | | 222/71 |
| 4,172,028 A | * | 10/1979 | Dunn | ........................ B03C 7/12 |
| | | | | 209/12.2 |
| 4,227,835 A | | 10/1980 | Nussbaum | |
| 5,484,061 A | * | 1/1996 | Dunn | ........................ B03C 7/04 |
| | | | | 209/12.2 |
| 5,551,642 A | * | 9/1996 | Dunn | ........................ B03C 7/04 |
| | | | | 241/301 |
| 5,769,276 A | * | 6/1998 | Alexander | ................ B05B 3/02 |
| | | | | 222/148 |
| 6,122,564 A | | 9/2000 | Koch | |
| 6,471,096 B1 | * | 10/2002 | Dave | ...................... B65D 88/64 |
| | | | | 222/196 |
| 6,651,843 B2 | | 11/2003 | Kowaisky et al. | |
| 2002/0189977 A1 | | 12/2002 | Maehata et al. | |
| 2015/0268099 A1 | | 9/2015 | Craig | |

* cited by examiner

ELECTROSTATIC POWDER FEEDER

CROSS REFERENCE TO RELATED APPLICATION

This application claims the benefit of and incorporates by reference the entirety of U.S. Provisional Patent Application No. 62/463,309 filed on Feb. 24, 2017.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates to techniques for feeding finely-divided particulate matter for use in manufacturing, measuring and processing applications. More specifically, this invention relates to methods for feeding metallic or conductive powders into equipment for metal additive manufacturing, welding, or cladding.

BACKGROUND OF THE INVENTION

In metal additive manufacturing, welding, and cladding applications, the quality of the powder stream is an important factor in build quality. It is important that the powder be consistently and accurately metered into the process at a wide range of powder feed rates.

The prior art discloses a variety of apparatuses for mechanically metering powder. For example, auger-type powder feeders are used commonly in industry. These feeders use a rotating screw or turbine wheel to move powder from a hopper into the process destination. With these feeders, often the rotation of the screw results in periodic pulsations of powder as the screw turns. Additionally, due to the abrasive nature of metallic powders, high wear typically occurs on the screw and drive components.

One solution to the problems associated with auger-type powder feeder is the vibratory feeder. For example, U.S. Pat. No. 2,187,717 (Weyandt) describes a vibratory electrical apparatus for conveying or handling difficult to move or handle materials, such as pastes, powders, sand, gravel, packages, articles and the like. U.S. Pat. No. 3,788,449 (Baberowski, et al) discloses a vibratory conveyor capable of periodic rotational and vertical vibrations.

Using vibrating tables to effect forward movement of powder particles is known in the additive manufacturing industry. With these devices vibration forces are imparted to powder particles situated on a table. The vibrating particles then fall off the edge of the vibrating table and into the process destination. This is a very inexpensive, simple, and robust method. However, the pulsations generated by the vibration results in perturbations in the powder flow, which is unacceptable for many additive manufacturing applications.

The prior art also discloses a variety of apparatuses that meter powder via a combination of mechanical moving elements and a motive gas. U.S. Pat. No. 3,909,068 (Coucher) and U.S. Pat. No. 3,517,861 (De La Vega) disclose examples of such devices. U.S. Pat. No. 4,227,835 (Nussbaum) discloses an apparatus that feeds powder using a continuous annular groove on a rotating metering plate and then sucks the powder out of the groove after the plate has rotated through a certain angle. Powder metering devices like those of Nussbaum can give smooth and accurate powder flow, even at relatively low flow rates. However, the technique of Nussbaum requires significant gas flow alongside the powder in order to effect the suction force required to evacuate the groove. This can be a problem for applications that require low gas flow or zero gas flow. Moreover, rotary disc feeders involve many moving parts and seals, which parts and seals increase the complexity and ultimately the cost of the powder feeder.

The aforementioned prior art devices for mechanically metering powder generally work well at high mass flow rates. However, these techniques become inconsistent at lower flow rates (under 1 gram per minute). Additionally, prior art devices that meter powder mechanically are often physically large and bulky and take up valuable space in the equipment or facility into which they are integrated. Existing mechanical metering powder feeders also involve significant complexity in their design and construction, which ultimately leads to high manufacturing and production costs.

Another deficit in the mechanical powder feeder of the prior art is that it must be expensively adapted in order to operate under conditions of high pressure, vacuum or high temperature. Such adaptations are exemplarily shown in U.S. Pat. No. 6,651,843 (Kowalsky, et al), which describes a method of adapting a disc powder feeder for high-pressure applications by enclosing the entire device in a pressure vessel to reduce the strain on the dynamic seals of the device.

Devices for metering powder without use of moving mechanical parts have also been suggested. For example, U.S. Pat. No. 4,071,169 (Dunn) describes a powder metering device that achieves very low flow rates utilizing electrostatically induced oscillation. U.S. patent application Ser. No. 14/994,973 also describes an electrostatic powder feeder. The entirety of that application is incorporated herein by reference. With the device of this application, a DC voltage supply creates an electric potential between first and second electrodes, which in a preferred embodiment are spaced 5-10 mm apart. A preferable potential for this spacing will be between one thousand and ten thousand volts between the first and second electrodes. The hopper gravity feeds (drops) an amount of powder on the first electrode. The powder upon the first electrode, being somewhat conductive, develops an electric charge on its surface due to the potential difference between the electrodes. However, by virtue of the electric potential and the positioning of the second electrode relative to the first electrode, the powder particles with the surface charge on the first electrode are caused to move (jump) initially off the first electrode toward the second electrode. The second electrode is preferably above the first electrode, wholly or partially to the side of the first electrode or both. In a direct mode feeder, the powder particles are caused to move toward the second electrode drop away from the second electrode due to the force of gravity. Preferably, the drawn particles will drop away before reaching the second electrode. Though even if they do reach the second electrode, they will eventually drop out of the feeder due to the force of gravity without ever re-contacting the first electrode or the powder pile upon it. U.S. patent application Ser. No. 14/994,973 also discloses a stochastic mode electrostatic feeder. With this type of feeder the particles oscillate between the electrodes in a manner that imbues the particles with two or three dimensions of motion (as opposed to just one dimension of travel to and from electrodes) such that a percentage of the oscillating particles will eventually move to a space in the feeder wherein the particles are no longer constrained between the electrodes and the force of gravity will allow them to escape the electrode space and be dispensed by the feeder.

The prior art electrostatic powder metering devices do, indeed, result in consistent powder flow at low flow rates. However, they require the presence of open, uninsulated, high-voltage electrodes in the presence of fine metallic powders. This situation can result in electrical arcing between the electrodes. When it occurs, this arcing causes powder feeding to stop until the arc is extinguished. The arcing can even result in the dangerous igniting of the powders.

In view of the deficits of the prior art powder metering devices, an improved powder metering device is desirable. In particular, it would be desirable to provide a device and method of metering powder particles that operate well at low mass flow rates (under 1 gram per minute) as well as higher feed rates. It is further desirable that metering devices and methods be able to quickly change between flow rates and be less complex and expensive to produce than prior art devices and methods. In addition, the devices and methods should provide these benefits while also providing highly consistent powder flow for additive manufacturing, welding, and cladding.

SUMMARY OF THE INVENTION

In a first embodiment, the present invention is directed to an improved electrostatic powder metering device that achieves powder motility and modulation of that motility via electrostatic forces. The present invention thus overcomes the deficits of prior art powder feeders by providing for an improved apparatus for feeding powders, particularly those used in laser metal deposition (LMD) processes. A preferred embodiment of the present invention includes a body having a cavity. The cavity is shaped and sized to hold a supply of powder particles. A powder landing surface is disposed within the body but below the cavity such that gravity acting upon the powder particles within the cavity causes the powder particles to fall upon the powder landing surface and create a pile of powder particles on the powder landing surface.

The first embodiment powder feeder includes a voltage supply in electrical communication with an electrode and the powder landing surface. The electrode and powder landing surface are relatively positioned such that there is a space between them. An insulator is disposed between the electrode and the powder landing surface and operates to thwart arcing across the space. The voltage supply produces an alternating current electric potential between the electrode and the powder landing surface, in turn creating an alternating electric field within the space. The alternating electric field acts upon the powder particles piled on the powder landing surface and causes them to oscillate between the insulator and the powder pile.

A powder-dispensing aperture is located in or proximate to the powder landing surface. In the preferred embodiment, the powder landing surface is ring-shaped (annular) and the aperture is centrally disposed in the powder landing surface. As discussed in U.S. patent application Ser. No. 14/994,973, the powder upon the powder landing surface, being at least somewhat conductive, develops an electric charge on its surface due to the potential difference between the powder landing surface and the electrode (the powder landing surface effectively acting as the first electrode described in the foregoing application). However, by virtue of the electric potential and the positioning of the electrode relative to the powder landing surface, the powder particles are caused to move (jump) initially off the powder landing surface toward the electrode. The electrode is preferably above the powder landing surface, but wholly or partially to the side of the powder landing surface (not simply directly overhead) so as to also impart a horizontal force to the powder particles.

In contrast to the apparatus discussed in U.S. patent application Ser. No. 14/994,973, in the present invention, particles are prevented from contacting the electrode directly by an insulating sheet. Particles that move towards the electrode, still being attracted to the electrode, will adhere to the lower surface of the insulator until the alternating electric field reverses, at which point the powder particles will be repelled by the electrode and return to the powder bed. For each cycle of the alternating potential applied to the electrode, particles on the surface of the powder pile will rise up, adhere to the insulator, then subsequently return to the powder pile. This process repeats at hundreds or thousands of times per second, creating a dense cloud of oscillating particles in the region between the powder bed and the lower surface of the insulator.

In the preferred embodiment in which the aperture is centrally disposed within the powder landing surface, the electrode would be located directly above the aperture. In the case where the aperture is not located in the powder landing surface, but proximate to it, the term "proximate" with respect to the aperture location vis-à-vis the powder landing surface means a distance at which particles would be drawn to the electrode due to the electric field between the electrode and particle bed. This distance would be dictated mainly by the field strength and the mass of a powder particle, and is typically between 1 to 15 millimeters for most powders.

Preferably the cavity of the preferred first embodiment feeder is defined by a cavity wall. A diverter is disposed (preferably centrally) in the cavity and positioned away from the cavity wall so as to create a powder flow space between the diverter and the cavity wall. More preferably, the cavity wall will include a downwardly and inwardly projecting segment that projects downwardly and inwardly toward the diverter. The downwardly and inwardly projecting segment preferably includes a distal portion disposed above a portion of the diverter. This ensures that the weight of powder in the hopper will have a reduced effect on the output powder feed rate. Additionally and particularly when the aperture is located in the powder landing surface, the aperture is defined by a lip disposed on the powder landing surface and circumscribing the aperture. In the depicted preferred embodiment, the diverter is positioned above the powder landing surface and overhangs and extends beyond the entirety of the aperture. These structural arrangements prevent powder particles from directly dropping from the cavity through the aperture so that they can pile upon the powder landing surface and be acted upon by the electric field.

The first embodiment feeder can be enhanced to include a receptacle to receive a heating element. It can also be enhanced to include a receptacle to receive a temperature sensor.

In a second embodiment the present invention is directed to an improved electrostatic powder metering device that achieves powder motility and modulation of that motility via electrostatic and vibratory forces. In this regard, the second preferred embodiment invention is a hybrid electrostatic powder feeder. The feeder includes an oscillating surface built into its lower portion. In the preferred embodiment, the oscillating surface is a diaphragm. The diaphragm is mechanically isolated from the rest of the feeder such that the diaphragm is allowed to oscillate while still maintaining a seal to keep powder in the feeder from escaping. In the preferred embodiment, this is accomplished by means of a gasket, flexure, or other compliant member between the lower oscillating surface and the feeder. In the preferred embodiment, the aperture where the powder may exit is located in the center of the diaphragm.

In particular description, the second embodiment feeder includes a body that houses a cavity. The cavity is shaped and sized to hold a supply of powder particles. A diaphragm is disposed within the body but below the cavity such that gravity acting upon the powder particles within the cavity causes the powder particles to fall upon the diaphragm and create a pile of powder particles on the diaphragm. In the preferred embodiment, an aperture is disposed in the diaphragm, but as in the case of the first embodiment feeder, it may be positioned proximate to the diaphragm. A vibration actuator is affixed to the diaphragm. A voltage supply is in electrical communication with an electrode that, as in the case of the first embodiment feeder, is disposed remotely from the diaphragm so as to create a space between the electrode and diaphragm. An insulator is disposed between the electrode and the diaphragm. The voltage supply produces an alternating electric potential between the electrode and the diaphragm that creates an alternating electric field within the space.

The alternating electric field created within the space causes the powder particles falling onto the diaphragm to develop an electrical surface charge and be subject to an alternating electrostatic force that causes the powder particles to oscillate between the powder pile and insulator. Oscillating particles have a strong tendency to move toward regions of lower oscillating particle concentration, and thus move toward and exit through the aperture. The feeder can have a configuration that includes the structural content and positioning of the diverter, cavity, cavity wall, powder flow space, downwardly and inwardly projecting segment, electrode and aperture described above. The second embodiment feeder can be enhanced to include a receptacle to receive a heating element (not shown). It can also be enhanced to include a receptacle to receive a temperature sensor (not shown).

Embodiment powder feeders in accordance with the present invention can be made very compact. In fact, the powder feed mechanism can be built into the feeder itself, meaning such a powder feeder can be integrated seamlessly into larger machines or assemblies without having to allocate space for a large, bulky powder feeder.

In contrast to prior art feeders, a powder metering device of the present invention is able withstand extreme environments such as high pressure, vacuum and high temperature without expensive modification. As shown herein, the powder feed mechanism disclosed in the present invention can be easily adapted for such a high back-pressure application by simply increasing the thickness of the outermost walls of the device and providing pressure equalization ports in the top of the hopper and into the sealed region below the diaphragm where the vibration actuator lies to eliminate pressure traps.

BRIEF DESCRIPTION OF THE DRAWINGS

FIG. 1 is a section view showing a first preferred embodiment present invention improved electrostatic powder feeder.

FIG. 2 is a cut-away view of a second preferred embodiment feeder, a hybrid electrostatic feeder, that uses electrostatic and vibratory force to effect powder motility.

FIG. 3 is a chart showing the input vibration motor angular velocity and output powder mass flow rate for a particular embodiment utilizing a rotating eccentric mass motor.

FIG. 4 is a section-view depicting an embodiment hybrid electrostatic feeder adapted for applications which require powder to be injected into a pressurized gas stream.

FIG. 5 is a section view depicting an embodiment of the hybrid electrostatic powder feeder with temperature control and output sieve.

FIG. 6 is a detail section view depicting preferred lower feeder geometry for an embodiment of the present invention hybrid electrostatic powder feeder.

FIG. 7 is a cut-away view showing a radially-symmetric implementation of the basic geometry shown in FIG. 5.

FIG. 8 shows a non-radially symmetric implementation of the basic geometry shown in FIG. 5.

FIG. 9 shows an alternative embodiment hybrid electrostatic feeder utilizing a flexure rather than an elastomer flexible sealing member.

DETAILED DESCRIPTION

The invention is described in detail in this section and in the accompanying figures. In the figures, like numbers correspond to like features. FIG. 1 depicts a first embodiment powder feeder 100 utilizing an improved electrostatic structure and method. As seen in FIG. 1, first preferred embodiment feeder 100 includes a body 16 with a cap 1. Body 16 houses a cavity 30. Cavity 30 is shaped and sized to hold a supply of powder particles 2. A powder landing surface 27 is disposed within body 16 but below cavity 30 such that gravity acting upon the powder particles 2 within cavity 30 causes the powder particles 2 to fall upon the powder landing surface 27 and create a pile 4 of powder particles 2 on powder landing surface 27.

The first embodiment powder feeder includes a voltage supply 37 in electrical communication with electrode 5 (via electrically insulated wire 14) and powder landing surface 27. Electrode 5 and powder landing surface 27 are relatively positioned such that there is a space 28 between them. Insulator 6 is disposed between electrode 5 and powder landing surface 27 and operates to thwart arcing across space 28. Voltage supply 37 produces an alternating current electric potential between electrode 5 and the powder landing surface 27 that creates an electric field within space 28. The electric field will act upon powder particles 2 piled on the powder landing surface 27 and cause them to oscillate between electrode 5 and insulator 6.

Powder-dispensing aperture 34 is located in or proximate to powder landing surface 27. In the preferred embodiment, powder landing surface 27 is ring-shaped (annular) and aperture 34 is centrally disposed in powder landing surface 27. As discussed in U.S. patent application Ser. No. 14/994,973, powder pile 4 upon powder landing surface 27, being composed of particles 2 that are at least somewhat conductive (having an electrical resistivity less than $1\times10^{15}$ ohm-cm), develops an electric charge on its surface due to the potential difference between powder landing surface 27 and electrode 5. However, by virtue of the electric potential and the positioning of electrode 5 relative to powder landing surface 27, powder particles 2 with the surface charge on powder landing surface 27 are caused to jump initially off pile 4 on powder landing surface 27 toward electrode 5.

Electrode 5 is preferably above powder landing surface 27, but wholly or partially to the side of powder landing surface 27 (not solely directly overhead) so as to also impart a horizontal force to powder particles 2. Powder particles 2 being caused to move toward electrode 5 are prevented from directly contacting electrode 5 by insulator 6 and adhere to insulator 6. Powder particles 2 that move towards electrode 5, still being electrically attracted to electrode 5, will adhere to insulator 6 until the alternating electric field reverses, at which point the powder particles 2 will be repelled by electrode 5 and return to the powder pile 4. For each cycle of the alternating potential applied to electrode 5, powder particles 2 on the surface of the powder pile 4 will rise up, adhere to the insulator, then subsequently return to powder pile 4. This process repeats hundreds or thousands of times per second, creating a dense cloud of oscillating particles in the region between powder pile 4 and insulator 6. Oscillating particles have a strong tendency to move toward regions of lower oscillating particle concentration, and thus particles oscillating between powder pile 4 and insulator 6 move toward and exit through the aperture 34.

In the preferred embodiment in which aperture 34 is centrally disposed within powder landing surface 27, electrode 5 is located directly above aperture 34. As shown in FIG. 1, electrode 5 may have a greater area than, and superpose, aperture 34.

As seen in FIG. 1, cavity wall 31 includes downwardly and inwardly projecting segment 32. Diverter 33 is disposed in cavity 30 and is surrounded by, but spaced apart from, downwardly and inwardly projecting segment 32. In the embodiment shown in FIG. 1 diverter 33 is conically shaped and is axially disposed in cavity 30. The powder 2 should preferably be electrically conductive. During operation, powder supply 2 flows downward towards annular opening 17. As powder flows downward through feeder 100, it is guided inwardly by downwardly and inwardly projecting segment 32 of wall 31. As powder particles 2 fall onto segment 32 they are guided towards diverter 33. Downwardly and inwardly projecting segment 32 includes an inner (distal) portion 40 disposed above a portion of the periphery of diverter 33.

Figure 5:
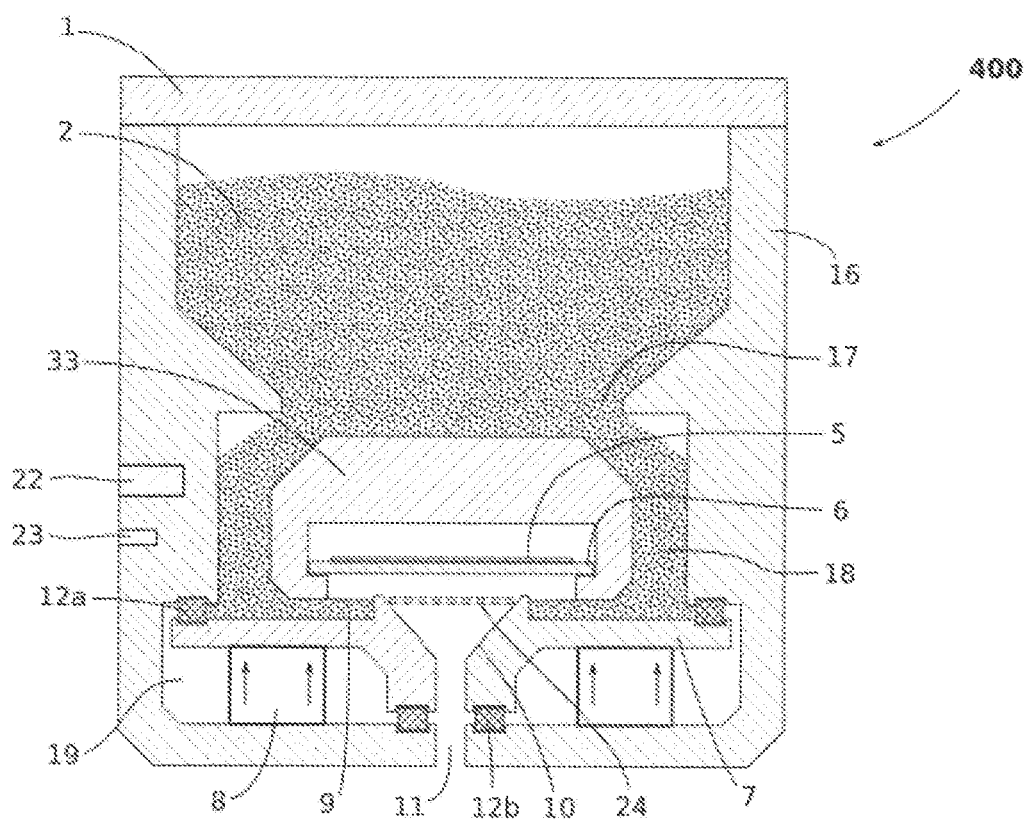

Preferably cavity 30 of the preferred first embodiment feeder is defined by cavity wall 31 and encompasses diverter 33. Diverter 33 is disposed (preferably centrally) in cavity 30 and positioned away from cavity wall 31 so as to create powder flow space 26 between diverter 33 and cavity wall 31. More preferably, cavity wall 31 will include downwardly and inwardly projecting segment 32 that projects downwardly and inwardly toward diverter 33. Downwardly and inwardly projecting segment 32 preferably includes distal portion 40 disposed above a portion of diverter 33. Additionally and particularly when aperture 34 is located in powder landing surface 27, aperture 34 is defined by lip 35 disposed on powder landing surface 27 and circumscribing aperture 34. In the depicted preferred embodiment, diverter 33 is positioned above powder landing surface 27 and overhangs and extends beyond the entirety of aperture 34. These structural arrangements prevent powder particles 2 from directly dropping from cavity 30 through the aperture 34 so that they can pile upon powder landing surface 27 and be acted upon by the electric field. Like the hybrid feeder shown in FIG. 5, the first embodiment feeder can be enhanced to include a receptacle 22 to receive a heating element. Also like the hybrid feeder shown in FIG. 5, it can also be enhanced to include a receptacle 23 to receive a temperature sensor.

After forming pile 4 beneath diverter 33, powder 2 from the powder supply in cavity 30 is allowed to rest naturally on powder landing surface 27 according to the powder's angle of repose, denoted $A_r$ in FIG. 1, forming powder pile 4. Powder landing surface 27 preferably includes lip 35 that defines aperture 34 in the shown preferred embodiment. In the embodiment shown in FIG. 1, lip 35 is located at the upper edge of output funnel 10 to prevent powder from freely flowing off of powder landing surface 27 into output funnel 10 when the device is not in operation. Lip 35 should be entirely located above the lower end 39 of powder pile surface 38 to prevent powder 2 from exiting through aperture 34 when feeder 100 is not in operation.

As noted, embodiment feeder 100 includes electrode 5 and insulator 6. An alternating potential high voltage signal is applied to electrode 5, which induces powder at the surface 38 of pile 4 to begin oscillating. The oscillating particles 2 oscillate between powder pile surface 38 and insulator 6. Due to the fact that oscillating particles have a strong tendency to move towards regions of lower oscillating particle concentration and due to the angle $A_r$ between powder surface 38 and the lower surface of insulator 6, collisions between these two surfaces impose a net inward motion to the oscillating particles. Thus, oscillating particles move towards and eventually into centrally located aperture 34 and through outlet 11.

A high voltage alternating-potential signal is applied between electrode 5 and conductive, electrically grounded body 16 via insulated wire 14. This signal is created typically by means of a high voltage supply 37, such as a high voltage transformer or high voltage electrical inverter. The voltage signal amplitude should typically be between 0.5 to 5 kilovolts per millimeter of spacing between electrode 5 and lip 35. The voltage signal should also typically have a frequency between 20 Hz and 1,000 Hz. Wire 14 passes through body 16 via sealed hole 15. Wire 14 is preferably electrically and mechanically bonded to electrode 5 at point 20 by means of soldering or spot-welding.

In embodiment feeder 100 of FIG. 1, powder feed rate is typically achieved by adjusting the amplitude of the alternating potential high voltage signal applied to electrode 5. Increasing the amplitude of the alternating potential high voltage signal will increase the electric force experienced by the particles, causing them to oscillate faster and exit the device more rapidly. The amplitude of the high voltage alternating potential signal amplitude should typically be between 0.5 and 5 kilovolts per millimeter of distance between electrode 5 and lip 35. Tests have shown that the frequency of the signal applied to electrode 5 should typically be between 20 Hz and 1000 Hz for best performance.

As noted, in contrast to the prior art electrostatic devices, the electrode or sheet of the present invention feeder is surrounded by insulating material and uses an alternating potential to induce oscillation of powder. In contrast, the device of Dunn indicates that a non-oscillating electric potential (a DC voltage) is sufficient to induce electrostatic oscillation of the powder particles. However, tests have shown that if using a DC potential, the electrode must be directly exposed to the oscillating powder. This exposure can result in undesirable electrical arcing. Tests have shown that this arcing can be prevented if the electrode is totally enclosed in an insulating material. However, if the electrode is insulated, then an alternating potential is required to induce oscillation. The preferred embodiment frequency for the alternating potential is 20 Hz to 1000 Hz. A preferred embodiment amplitude (peak) for the electrode voltage is 0.5 to 5 kilovolts per millimeter of spacing between electrode 5 and lip 35.

The device 100 of FIG. 1 has the advantage of having no moving parts or seals. This decreases the manufacturing costs and simplifies the design. Note that the angle of repose $A_r$ must be relatively consistent for device 100 to operate reliably. If the angle of repose $A_r$ increases significantly, then powder will disadvantageously flow into aperture 34 when no signal is applied to electrode 5. If the angle of repose $A_r$ decreases significantly, the powder feed rate will be reduced due to increased distance between surface 27 and electrode 5. Thus, device 100 is suited best for highly flowable powders, and powders with consistent morphology.

Figure 2:
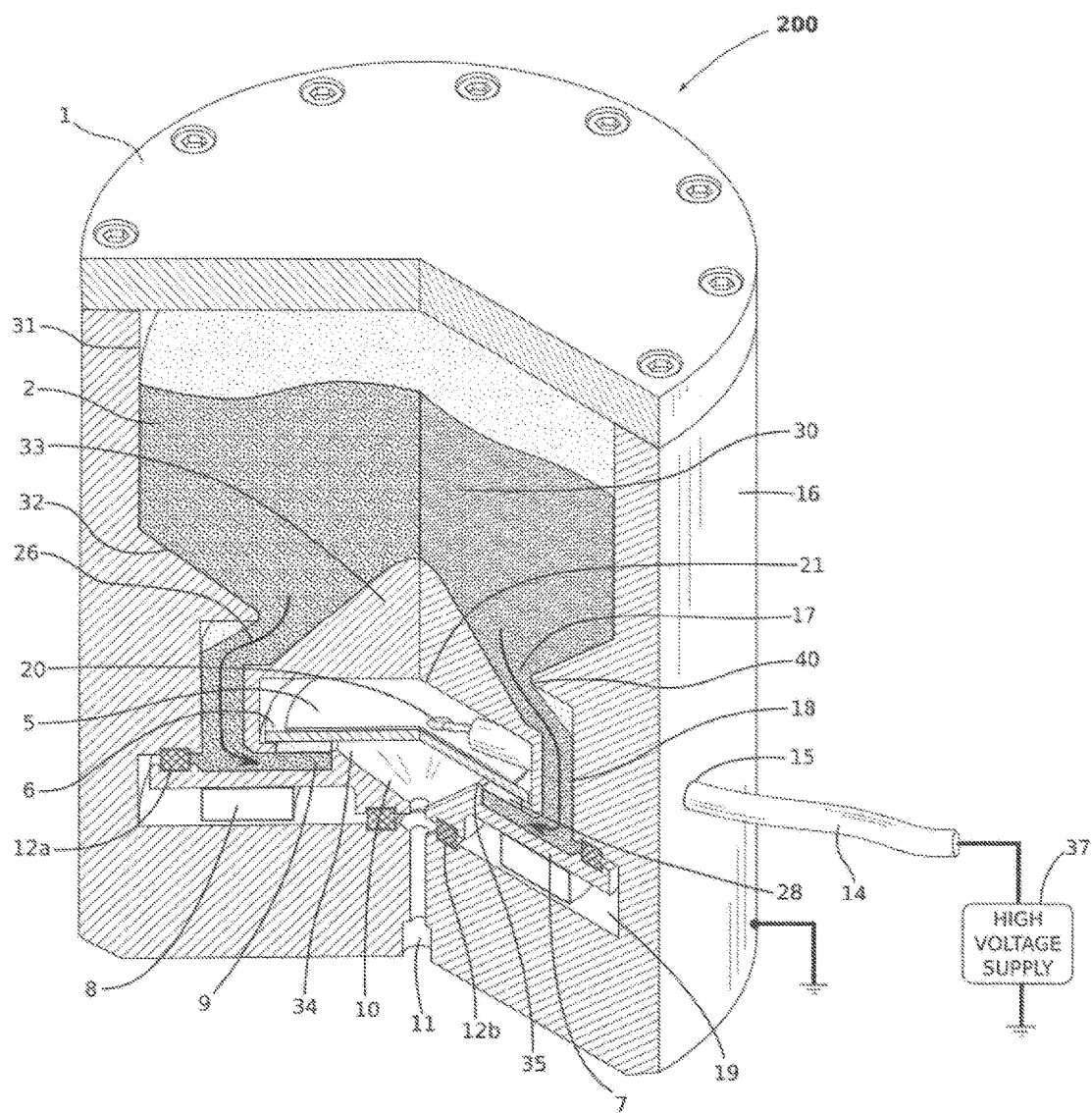
Figure 3:
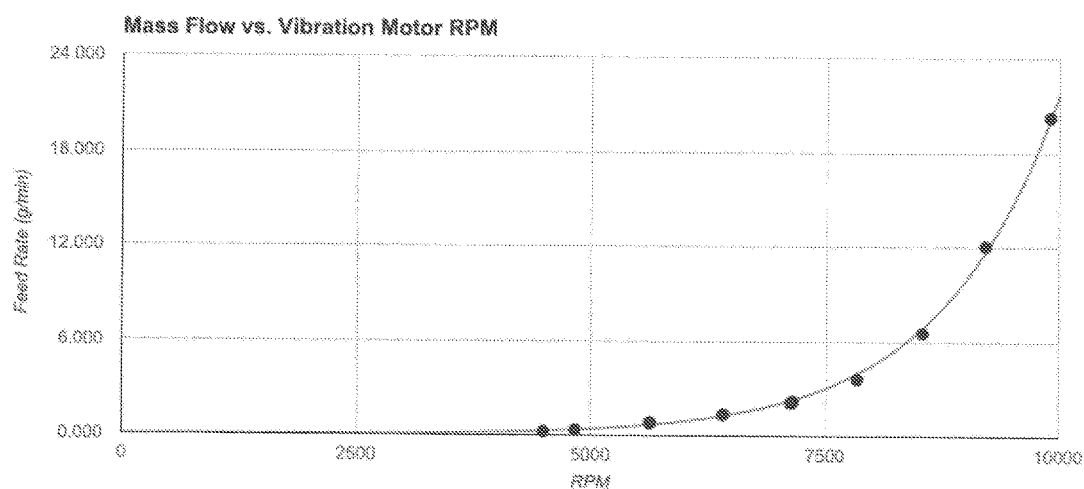
Figure 4:
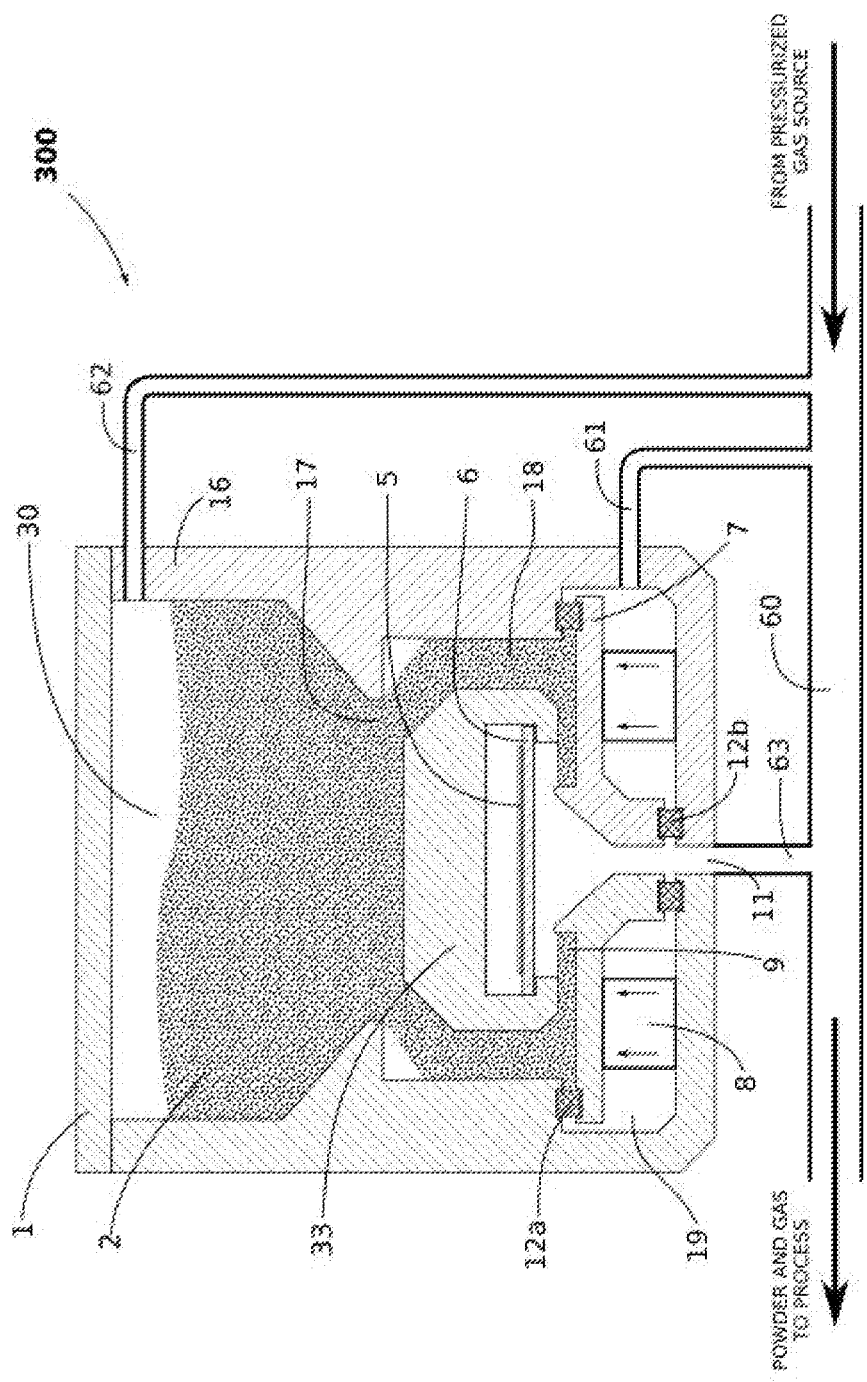

In a second embodiment the present invention is directed to an improved electrostatic powder metering device 200 that achieves powder motility and modulation of that motility via electrostatic and vibratory forces. In this regard, the second preferred embodiment invention is a hybrid electrostatic powder feeder 200. This embodiment feeder is depicted in FIG. 2. The feeder includes an oscillating surface built into its lower portion. In the preferred embodiment, the oscillating surface is a diaphragm 7. Diaphragm 7 is mechanically isolated from the rest of feeder 200 such that diaphragm 7 is allowed to oscillate while still maintaining a seal to keep powder 2 in feeder 200 from escaping. In the preferred embodiment, this is accomplished by means of a gasket, flexure, or other compliant member 12*a*, 12*b* between diaphragm 7 and body 16. Compliant members 12*a*, 12*b* thus acts as isolation mounts. In the preferred embodiment, towards the center of diaphragm 7 there is an aperture 34 where powder 2 may exit.

In particular description, the second embodiment feeder 200 includes body 16 having cap 1. Body 16 houses cavity 30. Cavity 30 is shaped and sized to hold a supply of powder particles 2. Diaphragm 7 is disposed within body 16 but below cavity 30 such that gravity acting upon powder particles 2 within cavity 30 causes powder particles 2 to fall upon diaphragm 7 and create a bed 9 of powder particles 2 on diaphragm 7. In the preferred embodiment, aperture 34 is disposed in diaphragm 7, but as in the case of the first embodiment feeder, it may be positioned proximate to diaphragm 7. Vibration actuator 8 is affixed to diaphragm 7. Voltage supply 37 is in electrical communication with electrode 5 via wire 14. Electrode 5 is disposed remotely from diaphragm 7 so as to create space 28 between electrode 5 and diaphragm 7. Insulator 6 is disposed between electrode 5 and diaphragm 7. Voltage supply 37 produces an alternating electric potential between electrode 5 and diaphragm 7 that creates an alternating electric field within space 28.

The electric field created within space 28 causes powder particles 2 piling onto diaphragm 7 to develop an electrical surface charge and be subject to an electrostatic force that causes the powder particles 2 to oscillate between powder bed 9 and insulator 6. Then, due to the fact that oscillating particles have a strong tendency to move to regions of lower particle concentration, the particles 2 move towards and exit through aperture 34. Feeder 200 can have a configuration that includes the structural content and positioning of diverter 33, cavity 30, cavity wall 31, powder flow space 26, downwardly and inwardly projecting segment 32, electrode 5 and aperture 34 described above. As shown with respect to embodiment feeder 400 in FIG. 5, second embodiment feeder 200 can be enhanced to include receptacle 22 to receive a heating element and can be enhanced to include receptacle 23 to receive a temperature sensor.

In further description, second embodiment feeder 200 preferably includes cylindrical body 16 with sealing cap 1, which in the shown embodiment is circular. Body 16 is electrically conductive and connected to earth-ground. As seen in FIG. 2, body 16 includes a cavity 30. Cavity 30 is shaped and sized to hold a supply of powder particles 2. Cavity 30 is defined by cavity wall 31. Diverter 33 is disposed in cavity 30 and is positioned away from cavity wall 31 so as to create a powder flow space 26 between diverter 33 and cavity wall 31. Feeder 200 also includes diaphragm 7 connected to body 16 and is disposed below the powder flow space 26. Diaphragm 7 is sized and shaped to hold a quantity of powder falling from powder flow space 2. Diaphragm 7 includes aperture 34. Feeder 200 further includes vibration actuator 8 affixed to diaphragm 7, electrode 5 connected to a power supply (not shown) and insulator 6. Electrode 5 is positioned remotely from diaphragm 7. Insulator 6 is positioned between electrode 5 and diaphragm 7.

As is further seen in FIG. 2, cavity wall 31 includes downwardly and inwardly projecting segment 32. Diverter 33 is disposed in cavity 30 and is surrounded by, but spaced apart from, downwardly and inwardly projecting segment 32. In the embodiment shown in FIG. 2 diverter 33 is conically shaped and is axially disposed in cavity 30. Powder 2 should preferably be electrically conductive. Tests have shown that the maximum resistivity of the powder material should be less than $1 \times 10^{15}$ ohm-cm. During operation, powder 2 flows downward towards annular opening 17. As powder flows downward through feeder 200, it is guided inwardly by downwardly and inwardly projecting segment 32 of wall 31. As powder particles 2 fall onto segment 32 they are guided towards diverter 33. Downwardly and inwardly projecting segment 32 includes an inner (distal) portion 40 disposed above a portion of the periphery of diverter 33.

As powder particles 2 fall onto diverter 33 they are outwardly guided through powder flow space 26 toward the periphery of annular opening 17. As powder 2 continues to flow downward into the device, powder 2 is then diverted back radially outward, forming a consistent bed 9. The size and weight of bed 9 does not change as the supply of powder 2 is depleted and refilled. This ensures that the amount of powder in the supply of powder 2 does not affect the output powder flow rate. Powder 2 from cavity 30 flows down lower channel 18, which is preferably annular, and rests upon diaphragm 7. Powder 2 is prevented from flowing into lower chamber 19 by vibration isolation mounts 12*a*, 12*b* connecting diaphragm 7 to feeder 200. Isolation mounts 12*a*, 12*b* can be any known isolation mount known in industry, but are typically made from a resilient and compliant elastomer such as butyl rubber, Viton, or silicone rubber. Upper isolation mount 12*a*, along with lower isolation mount 12*b* serve the purpose of mechanically isolating diaphragm 7 from body 16 as well as sealing lower chamber 19.

As shown in FIG. 2, diaphragm 7 preferably includes a central aperture 34 that is defined by a lip 35 disposed on diaphragm 7 and circumscribing aperture 34. Diverter 33 is positioned above the inner portion of diaphragm 7 and overhangs aperture 34. With this arrangement powder 2 cannot directly free fall through aperture 34 from the upper portion of cavity 30. Instead, by virtue of the structural arrangement and relative positioning of downwardly and inwardly projecting segment 32, diverter 33, diaphragm 7 and aperture 34, powder traveling through feeder 200 must travel a serpentine powder flow path 26 to arrive at lip 35.

As noted, diaphragm 7 preferably includes a lip 35 edge along the top of aperture 34. This feature addresses the fact that some powder morphologies consist of spherical particles that readily roll across a flat surface. The addition of the lip 35 prevents highly flowable particles from rolling directly out of the outlet hole. Instead, they must rely on the fluidization from the vibration to exit the feeder in a controlled manner.

Vibration actuator 8 affixed to the lower side of diaphragm 7 causes diaphragm 7 to oscillate. Vibration actuator 8 is typically an eccentric-mass vibration motor or piezoelectric transducer. As diaphragm 7 vibrates, powder in lower channel 18 flows radially inward forming a bed 9 of powder. In the depicted preferred embodiment, circular electrode 5 is preferably affixed centrally within the device on top of electrically insulating disk 6 and within chamber 21. A high voltage alternating-potential signal is applied between electrode 5 and conductive, electrically grounded body 16 via insulated wire 14. This signal is created typically by means of a high voltage transformer or high voltage electrical inverter (not shown). The voltage signal amplitude should typically be between 0.5 to 5 kilovolts per millimeter of spacing between electrode 5 and lip 35. The voltage signal should also typically have a frequency between 20 Hz and 1,000 Hz. Wire 14 passes through body 16 via sealed hole 15. Wire 14 is preferably electrically and mechanically bonded to electrode 5 at point 20 by means of soldering or spot-welding. The alternating potential applied to electrode 5 causes powder in bed 9 to oscillate between powder bed 9 and electrical insulator 6. Note that because diverter 33 is electrically connected to grounded body 16, electric fields due to electrode 5 will terminate at the inner wall of chamber 21, and thus cannot affect powder in channel 18 or powder supply 2 as grounded conductors block electric fields.

Oscillating powder will naturally move toward regions of lower powder concentration due to interparticle interactions. Thus, the powder will move towards output funnel 10. Once powder is within funnel 10, it will no longer be close enough to electrode 5 for oscillation to occur. Thus, the powder will fall inward and exit through outlet 11. Changing the frequency or amplitude of the alternating potential signal applied to electrode 5 or changing the frequency or amplitude of the vibration actuator 8 will change the output powder flow rate. Typically the preferred method of modulating powder output rate is by maintaining a constant frequency and amplitude on the electrode potential while adjusting the vibration power. In contrast to feeder 100, hybrid electrostatic feeder 200 is suited for general purpose powder feeder.

FIG. 3 shows the input-output curve for an embodiment of the invention using a rotating eccentric mass motor as the vibration actuator 8. The graph shows the relationship between input motor speed in RPM and powder mass flow rate for a particular powder. Note that the relationship very closely follows an exponential curve. That is, the output powder flow rate for a given vibration motor speed can be modeled by the following equation:

$$\dot{M}=Ae^{b\omega}$$

. . . where $\dot{M}$ is the mass flow rate for a given powder, $\omega$ is vibration motor angular velocity, and A and b are constants which can be empirically determined by measuring flow rate at two or more different motor speed settings. Note that A and b will change depending on powder density, morphology, size distribution, and electrical conductivity.

In contrast to prior art electrostatic devices, electrode 5 is shielded by insulating material 6 and uses an alternating potential to induce oscillation of powder. Also in contrast to the prior art, an alternating electric potential (as opposed to a direct current potential) is applied to electrode 5 which causes particles within some critical distance to become electrically charged and oscillate between electrode and fluidized powder bed 9. As particles flow inward across diaphragm 7 due to fluidization, they enter the region of influence of the electrode at a steady rate and begin oscillating in a highly randomized manner. Oscillating particles have a strong tendency to move towards regions of lower particle concentration. Thus, particles that begin oscillating make their way towards, and eventually out of the aperture 34 in diaphragm 7 just as they would have with vibration only. However, the random oscillation created by the alternating potential has the effect of averaging the pulsations from the vibration actuator and results in a very smooth and consistent powder flow output. In fact, this optimization may even be applied to any vibrational powder feeder to smooth out the pulsations in powder flow created by vibratory motion.

If powder feeder 200 is used for processes in which powder is delivered into a pressurized gas stream, body 16 can be constructed in such a way that powder feeder 200 can withstand the internal pressure. This can be accomplished by, for instance, increasing the thickness of the walls of body 16 and sealing cap 1 to withstand the required internal pressure without significantly deforming. Additionally, for such applications, the device must be constructed in such a way that pressure traps cannot form. FIG. 4 shows an embodiment feeder 300 for use with processes that require powder be metered into a pressurized gas stream. Device 300 features a main delivery tube 60 into which powder is metered. Powder is metered out of outlet 11 through connecting tube 63 and into the gas stream flowing in main delivery tube 60. Pressure equalization channels 61 and 62 are connected to main delivery tube 60 upstream of connecting tube 63. Pressure equalization channels 61 and 62 allow high pressure gas from main delivery tube 60 to flow freely into chamber 19 and cavity 30, respectively. This ensures pressure is equal throughout the device.

FIG. 5 depicts an embodiment feeder 400 that includes two receptacles 22 and 23 in body 16. Receptacles 22 and 23 are respectively sized and shaped to respectively receive a heater cartridge or other heat-producing device (not shown) and a temperature sensor (not shown). Outfitting either embodiment feeder with a heater and temperature sensor allows the entire feeder to be heated and maintained at a stable temperature, regardless of the temperature of the operating environment. With particular reference to the hybrid electrostatic feeder, without temperature control, changes in environmental temperature can cause changes in the elasticity of flexible members 12*a* and 12*b*, which ultimately results in slight changes in powder flow rate. By controlling the temperature using the inventive device and method, powder flow rate stability and repeatability can be improved across a wide range of operating environment conditions.

The embodiment feeder 400 of FIG. 5 also preferably includes a mesh sieve 24 above the outlet funnel 10. Mesh sieve 24 prevents any agglomerates larger than the pores in the sieve from exiting the device. Instead, agglomerates will oscillate between sieve 24 and insulator 6 until broken into sufficiently small pieces. This is an important optimization as many processes can be adversely affected by the presence of large agglomerates in the powder stream.

As is seen from the figures, the foregoing described embodiments are described in the context of preferred embodiment cylindrical and radially symmetric configurations. However, embodiments of this invention are not limited to solely cylindrical or radially symmetric designs. Key to the invention is the geometric arrangement of the feeder structure near the funnel area. In this respect, FIG. 6 shows a detail view of the preferred embodiment basic structures and geometry for the near-funnel area of a feeder having the features described herein.

Figure 6:
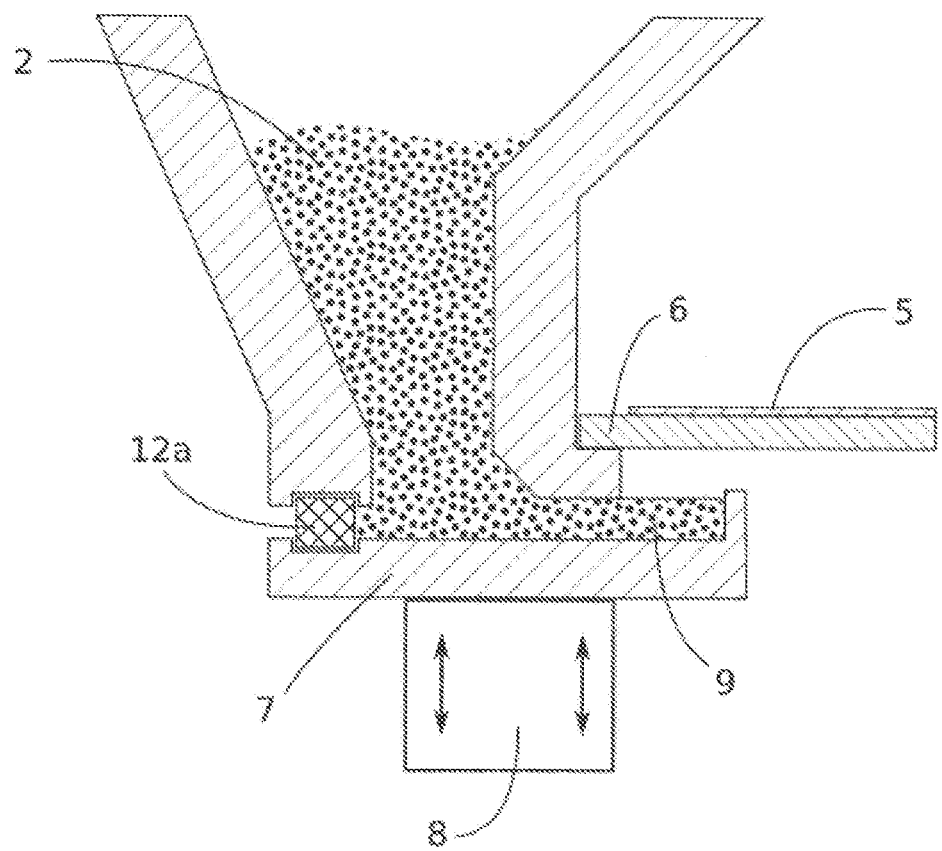
Figure 7:
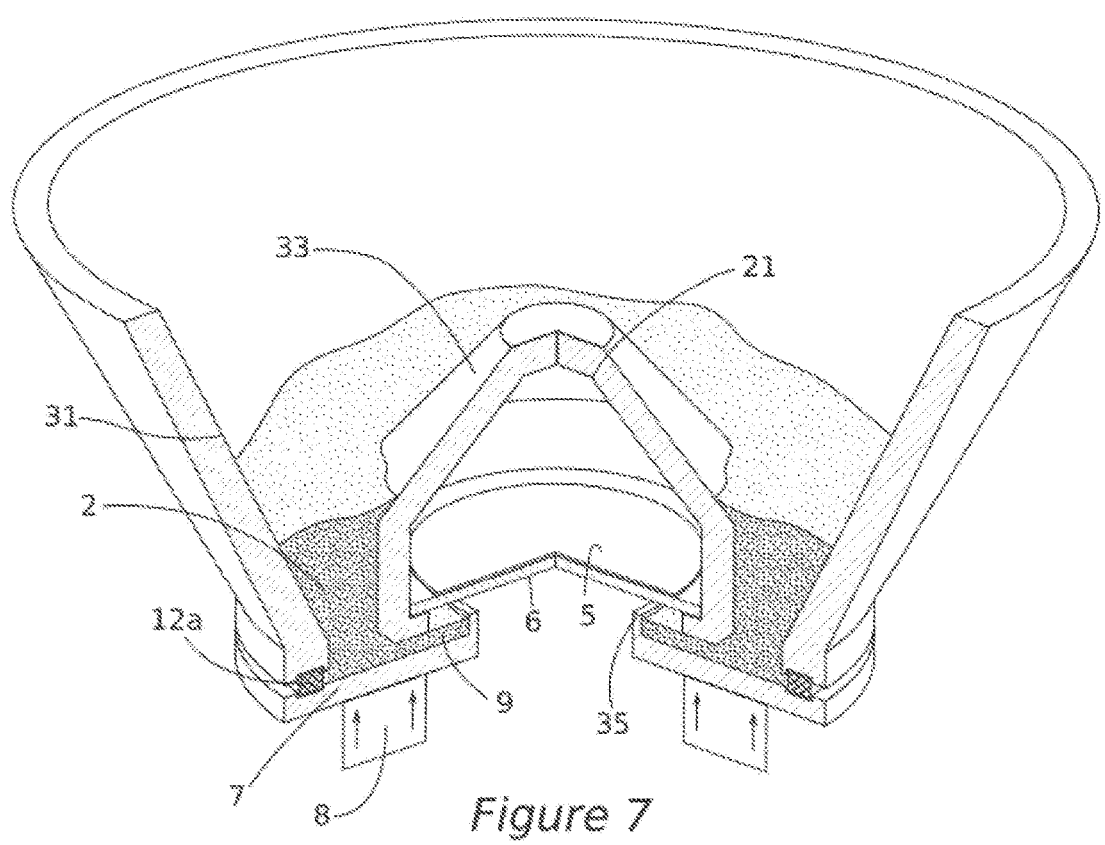
Figure 8:
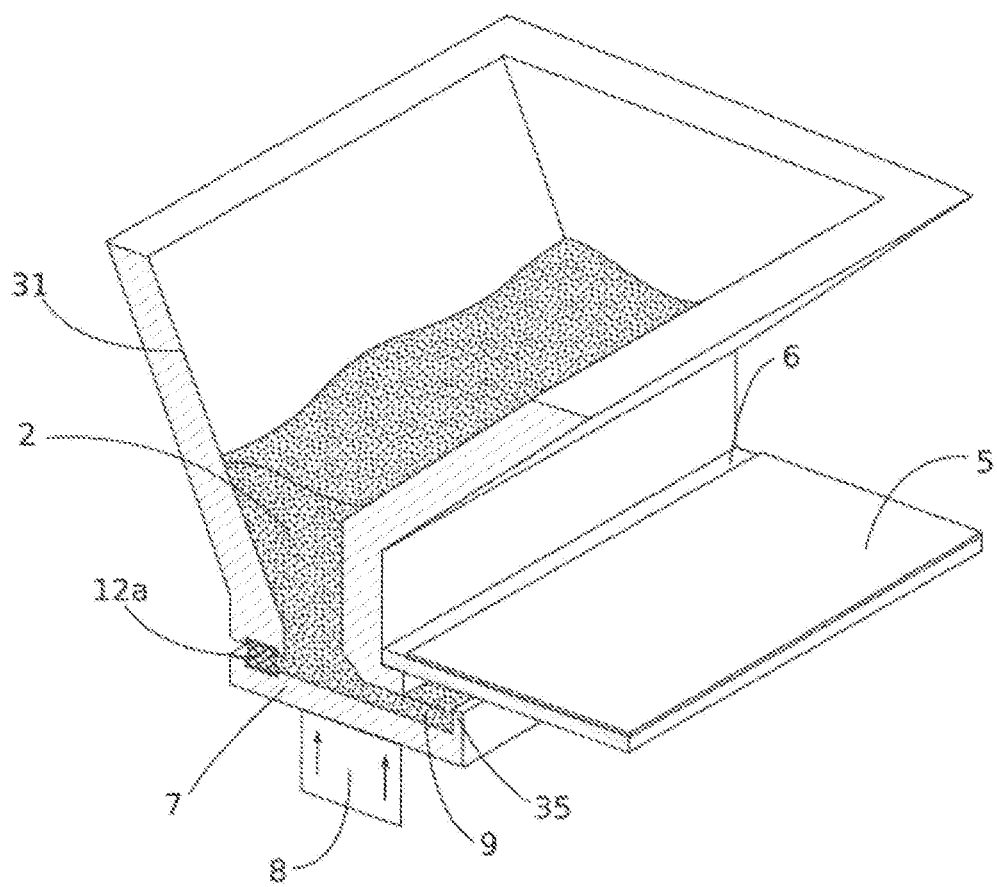

FIG. 7 and FIG. 8 show two exemplary structures for implementing the preferred embodiment near-funnel structural arrangement and geometry shown in FIG. 6. In the structures of FIG. 7, the feeder has a radially-symmetric design similar to embodiments discussed previously. In the structures of FIG. 8, the feeder uses a linear implementation to effect the preferred embodiment structural arrangement and geometry.

Figure 9:
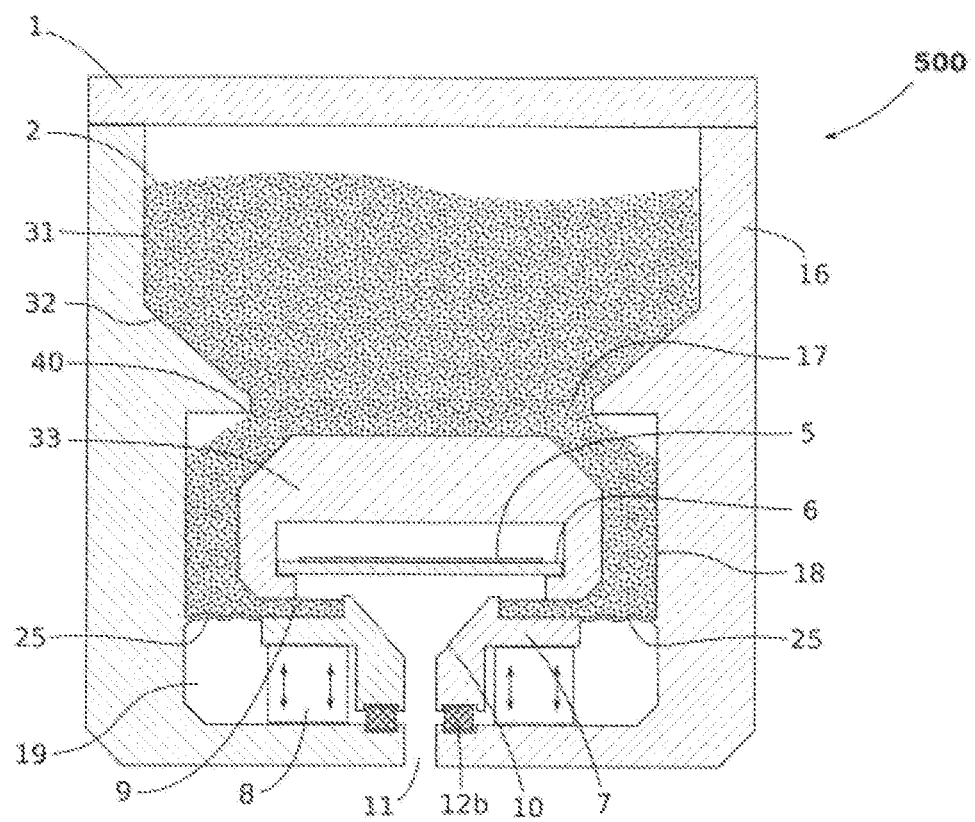

FIG. 9 depicts an embodiment powder feeder 500 in which upper isolation mount 12a is replaced with a flexure 25. Flexure 25 is typically a thin metal sheet that optionally includes corrugations to increase flexibility. Using flexure 25 in place of isolation mount 12a may be advantageous for manufacturing or longevity purposes. Note that lower isolation mount 12b may also be replaced with a flexure.

The electrodes and insulators in the discussed embodiments have been described in context of their preferred embodiment circular and flat shapes. This is not a strict requirement for electrode or insulator shape, but rather a preferred configuration. For instance, in embodiment 100 of FIG. 1, electrode 5 and insulator 6 could instead be conically shaped so as to maintain a constant distance between surface 38 and electrode 5. Similar electrode and insulator shape adaptations can be made to other embodiments of this invention as well.

In operation, the output powder feed rate of the hybrid electrostatic powder feeders described herein is determined by the amplitude and frequency of the vibration as well as the amplitude and frequency of the voltage applied to the electrode. Thus, powder feed rate can be adjusted by changing any of these parameters. In practice, it has been determined that typically the most convenient method of adjusting powder feed rate is to maintain a constant voltage amplitude and frequency on the electrode while modulating the amplitude of the vibration actuator.

The inventive feeders described herein work particularly well with powders commonly used in laser metal deposition operations, whether they be ferrous based or non-ferrous based metallic powders. The invention will also work with powders formed of any material that is not a strong insulator (i.e., that is somewhat conductive) and which allows for the formation of surface charges on the individual powder particles. Tests have shown that the maximum resistivity of the powder material should be less than $1 \times 10^{15}$ ohm-cm.

While the present invention has been disclosed in its preferred form, the specific embodiments thereof as disclosed and illustrated herein are not to be considered in a limiting sense, as numerous variations are possible. The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A powder feeder, the feeder comprising:
    a body including a cavity, the cavity shaped and sized to hold a supply of powder particles;
    a powder landing surface disposed within the body but below the cavity such that gravity acting upon the powder particles within the cavity causes the powder particles to fall upon the powder landing surface and create a pile of powder particles on the powder landing surface;
    a voltage supply in electrical communication with an electrode and the powder landing surface, the electrode and powder landing surface having a space between them;
    an insulator disposed between the electrode and the powder landing surface;
    the voltage supply producing an alternating current electric potential between the electrode and the powder landing surface that creates an alternating electric field within the space;
    an aperture located in or proximate to the powder landing surface; and
    the electric field created within the space causing the powder particles falling onto the powder landing surface to develop an electrical surface charge and be subject to an electrostatic force that causes the powder particles to initially oscillate between pile and insulator and then after that initial oscillation exit through the aperture.

2. The powder feeder of claim 1 wherein the cavity is defined by a cavity wall and a diverter is disposed in the cavity and positioned away from the cavity wall so as to create a powder flow space between the diverter and cavity wall.

3. The powder feeder of claim 2 wherein the electrode is positioned above the aperture.

4. The powder feeder of claim 3 wherein the aperture is defined by a lip disposed on the powder landing surface and circumscribing the aperture.

5. The powder feeder of claim 2 wherein the cavity wall includes a downwardly and inwardly projecting segment and the diverter is disposed in the cavity and surrounded by, but spaced apart from, the downwardly and inwardly projecting segment.

6. The powder feeder of claim 5 wherein the downwardly and inwardly projecting segment includes a distal portion disposed above a portion of the diverter.

7. The powder feeder of claim 6 wherein the diverter is positioned above the powder landing surface and overhangs the entirety of aperture.

8. The powder feeder of claim 1 further including a receptacle to receive a heating element.

9. The powder feeder of claim 1 further including a receptacle to receive a temperature sensor.

* * * * *